Oct. 4, 1960
B. W. OSWALT
2,954,673
HYDRAULIC ADJUSTING MECHANISM
Filed Nov. 15, 1957
Fig.1
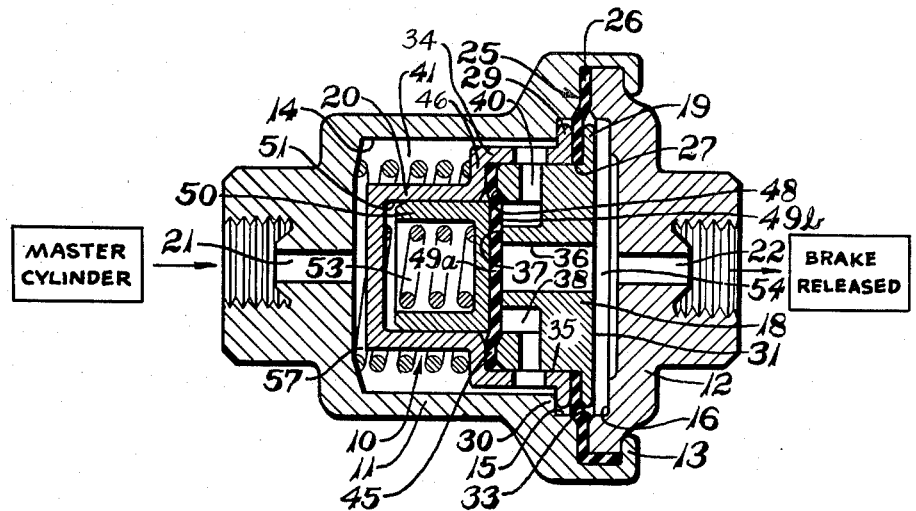
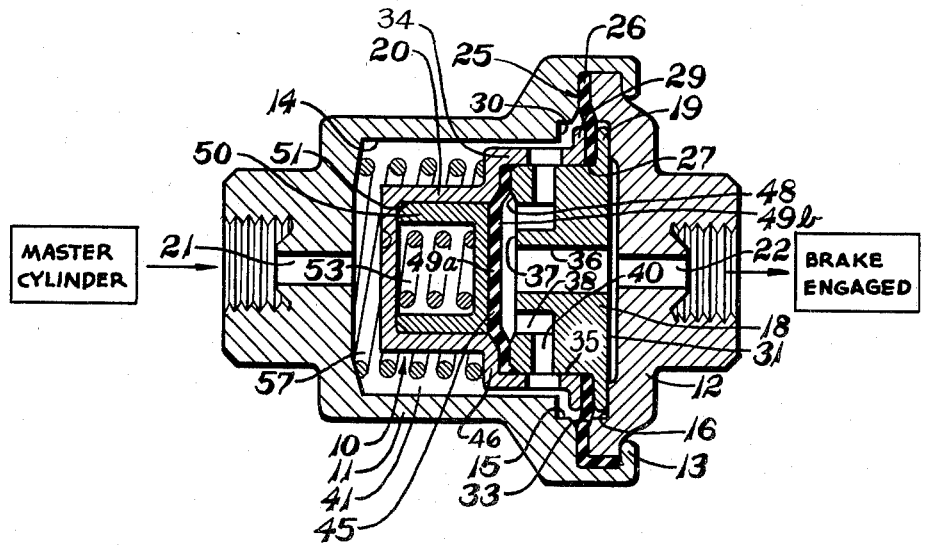
Fig.2
INVENTOR.
BURLIN W. OSWALT
BY
John D. Haney
ATTY.

United States Patent Office 2,954,673
Patented Oct. 4, 1960

2,954,673

HYDRAULIC ADJUSTING MECHANISM

Burlin W. Oswalt, Union, Ohio, assignor to The B. F. Goodrich Company, New York, N.Y., a corporation of New York Filed Nov. 15, 1957, Ser. No. 696,718

5 Claims. (Cl. 60—54.5)

This invention relates to improvements in mechanisms for automatically adjusting hydraulic brakes to maintain a particular uniform release clearance between the engageable braking members and thereby provide a uniform pedal action for a braking system. The mechanism of this invention functions to effect such adjustments by automatically metering hydraulic fluid to or from the hydraulic motor of a brake during successive actuations of the brake. Although the mechanism has special utility for brakes, it may be used advantageously for regulating hydraulic motors in environments other than brakes where service conditions are similar to brakes.

The mechanism of this invention is a two-way adjuster. That is to say, it is adapted to compensate both for wear of the brake linings and also for changes in the release clearance brought about by abnormal thermal expansion and/or resilient deflection of the engageable braking members when the brake is engaged. A brake system embodying this mechanism cannot "fade" to relieve braking pressure, and the mechanism prevents a brake from becoming improperly locked regardless of the extent of the thermal expansion or deflection of the braking members. Moreover, when the braking members resume their normal positions following a braking application in which substantial thermal expansion or deflection has occurred, the mechanism is adapted to automatically reset the uniform release clearance between the braking members. The mechanism operates satisfactorily for both drum or disc type brakes and is suitable for automotive brakes as well as for high energy aircraft brakes. The mechanism is also suitable for use with various forms of hydraulic motors such as piston, diaphragm, or expansible tube type hydraulic motors. The mechanism embodies the principles disclosed and claimed in my co-pending application, Serial No. 459,374, filed September 30, 1954, now Pat. No. 2,835,111.

Structural features of the present adjuster mechanism which cooperate to produce the foregoing results include a casing member having an actuated member therein and a valve mechanism that is adapted to open in response to a predetermined pressure of hydraulic fluid either in the portion of the brake system leading to the brake motor or in the fluid delivered to the adjuster mechanism from a pressure generating source such as a master cylinder. In accordance with the present invention, flexible fluid-impervious diaphragms are employed to connect the actuated member in sealing engagement in the casing member and also in the valve mechanism. These diaphragms advantageously eliminate the use of O-ring slidable seals throughout the mechanism. These diaphragms provide for sealing engagement of the parts with which they are associated, and at the same time avoid imposing any substantial frictional drag on the movement of these parts. In the adjusting mechanisms of my earlier patent applications cited in the foregoing remarks, O-ring seals have been employed and these have been entirely effective for their purpose. However, O-ring seals do impose a frictional drag on their associated parts which must be taken into consideration in designing the springs for the mechanisms, and since O-rings become progressively worn in service, the action of the springs of the mechanism may not be uniform throughout the life of the mechanism. By employing diaphragms for dynamic seals, I have found the valve action of the mechanism can be made much more sensitive. Moreover, with the diaphragm construction the associated parts of the mechanism need not have the smooth and precise machining that is required with O-ring seals. Accordingly, the mechanism of this invention is much easier to assemble and is proportionately less expensive to manufacture.

One form of adjuster mechanism embodying features in accordance with this invention is shown in the accompanying drawing in which:

Fig. 1 is a longitudinal axial sectional view of the adjuster mechanism with the brake associated therewith released; and Fig. 2 is a view similar to Fig. 1 but showing the relative positions of the parts of the mechanism when the brake is engaged.

Referring to the drawings, the main components of the adjuster mechanism selected for illustration include a piston assembly 10 positioned inside a cup-shaped casing member 11, the open end of which is closed by an end cap 12. The end cap 12 in this construction fits inside the rim 13 of the casing and is fastened by crimping or rolling the rim tightly around the periphery of the end cap.

The casing 11 has an internal axial bore 14 extending through the major portion of its length, and near the mouth of the casing there is an axially shorter counterbore 15 which mates with an annular recess 16 on the inside face of end cap 12 to define a space to receive the front end of piston assembly 10. The piston assembly 10 includes a rigid piston 18 having a radial peripheral flange 19 in the previously mentioned space. The piston 18 carries a valve housing 20 which projects axially into the bore portion 14 of the casing. Through the closed end of the casing 11 there is an inlet 21 opening into bore 14 to which inlet the bore 14 is connected with hydraulic actuating fluid from a pressure generator such as a master cylinder shown schematically. At the opposite end of the casing there is an outlet 22 leading through the end cap 12 from the space inside the casing in front of piston 18. In service the outlet 22 is connected to a fluid supply pipe (not shown) leading to a brake mechanism which is represented schematically. Thus the adjuster mechanism is in series between the master cylinder and the brake mechanism.

The piston assembly 10 is suspended axially inside casing 11 by an annular flexible fluid-impervious diaphragm 25. The outer peripheral margin 26 of the diaphragm is clamped tightly between the open end of the casing and the end cap 12 so that the margin 26 also acts as a gasket under the end cap to prevent leakage of fluid from the rim of the casing. The inner peripheral margin 27 of diaphragm 25 is clamped tightly between the radial flange 19 of piston 18 and a corresponding radial flange 29 at the rim of valve housing 20.

From the drawings it will be evident that the piston assembly 10 is capable of axial displacement in the casing from its released position in Fig. 1 (in which the radial flange 29 of housing 29 abuts a shoulder 30 of the casing) to its actuated position in Fig. 2 (in which the forward face 31 of piston 18 abuts end cap 12). The outer margin 26 of the diaphragm 25 is clamped to the casing in a plane located midway between these extreme positions of the piston assembly. Moreover, there is an appreciable circumferential clearance separating the radial flanges 19 and 29 from the surrounding walls of the casing, and inside the casing the mating surfaces of the casing and the end cap 12 between which margin 26 is engaged are beveled as at 33. This arrangement avoids extreme flexing of the diaphragm 25 as the piston assembly 10 is reciprocated axially of the casing and it also avoids pinching or chafing of the diaphragm. Also, to minimize tearing or stretching loads on the diaphragm when the mechanism is subjected to external shock forces, the circumferential clearance between the flared portion 34 of the valve housing 20 and bore 14 is smaller than the circumferential clearance about flanges 19 and 29 inside the casing. Thus when the mechanism is jarred, the flared portion 34 of the housing can engage the adjacent casing wall to prevent the diaphragm from being bruised or pinched.

The flared portion 34 of housing 20 is preferably pressed onto an external cylindrical rearward surface 35 of piston 18 although it may be threaded onto piston 18 if desired. Through the center of piston 31 there is an axial port 36 leading from the forward face 31 and opening into the interior of housing 20. Surrounding the mouth of port 36 inside the housing 20 is an annular valve seat 37 and concentric with the valve seat is an annular groove 38 which is connected by radial passages 40 in the piston and housing wall with the region inside the casing (in bore 14) supplied by fluid through inlet 21. This latter region is hereinafter called the inlet chamber 41 or "first chamber" of the mechanism.

Inside the valve housing 20 adjacent valve seat 37 there is a circular disc-like flexible fluid-impervious diaphragm 45 fitting transaxially of the housing and having its peripheral margins clamped securely between a shoulder 46 of valve housing 20 and the piston 18 by the press fit between the flared portion 34 of the housing and the surface 35 of the piston. The opposing clamping surfaces of shoulder 30 and piston 18 are beveled as at 48 to minimize extreme flexing of the margin of the diaphragm. The central region 49a of diaphragm 45 covers and closes port 36 and is also adapted to seat against valve seat 37 when the valve is closed. The annular region 49b of the diaphragm 45 (concentric with the previously mentioned center portion) is exposed to fluid in the groove 38 from the inlet chamber 41, and annular region 49b of the diaphragm serves as a hydraulic actuating surface for the valve mechanism. The pressure of fluid in groove 38 which acts on annular region 49b of the diaphragm is resisted and is opposed by a cup-shaped plunger 50 slidable in a bore 51 inside housing 20 and which is biased by spring 53 (when the brake is released) to urge the center 49a of the diaphragm 45 tightly against valve seat 37, thereby keeping port 36 closed. Diaphragm 45 and plunger 50 are arranged as hereinafter explained so that the diaphragm can be flapped toward and away from the valve seat 37 when either the fluid pressure in groove 38 or the fluid pressure in passage 36 is sufficient to overcome the biasing force of the spring 53.

The inlet chamber 41 inside the casing is normally full of hydraulic fluid supplied through inlet 21, and this fluid also fills passages 40 and groove 38. Diaphragm 45, however, prevents leakage of fluid into housing 20 between plunger 50 and bore 51. Also, the peripheral clamped margins of diaphragm 45 serve as a gasket to prevent leakage of fluid between shoulder 46 and the piston 18. The space inside housing 20 and behind plunger 50 in which spring 53 is located is void of hydraulic fluid so that the plunger 50 may be reciprocated against spring 53 without impedence of fluid behind it.

The spaces inside casing 11 in front of piston 18 between its forward face 31 and end cap 12 are filled with hydraulic fluid during service, and this region is hereinafter called the outlet or "second" chamber 54 of the mechanism. The outlet chamber together with the fluid contained in port 36 and in the tubing (now shown) to the brake motor is hereinafter called the "fluid link" of the brake system leading to the brake motor. The back pressure of this fluid link on the forward face 31 of piston 18 resulting from the spring force of the brake retractor springs (not shown) is effective to urge the piston assembly 10 to its inactive position in Fig. 1 so long as braking pressure is released on the master cylinder.

The mechanism 10 further includes a main spring 57 which externally surrounds the valve housing 20 in the inlet chamber 41 and which is compressed between the inlet end of the casing 11 and the shoulder 46 of the housing by the back pressure of the fluid link so that the forward face 31 of the piston is biased against the fluid in outlet chamber 54. Spring 54 cooperates with the valve mechanism in resetting the release clearance desired after an over-adjusted condition of the brake occurs, as will be more fully brought out in the ensuing explanation of the operation of the mechanism.

Both the diaphragm 45 and the diaphragm 25 are preferably of a rubber-like material which is chemically resistant to the particular hydraulic fluid used in the brake system. Neoprene compounds are generally suitable for hydraulic oil presently used for brakes of automotive vehicles. The diaphragms may be advantageously reinforced with a suitable fabric (not shown). It may be noted in this mechanism that the outer diameter of diaphragm 45 is equal to the inner diameter of diaphragm 25. Thus it is particularly convenient to cut both diaphragms from the same sheet of diaphragm stock; the diaphragm 45 is merely the portion of the stock removed to form the center hole in diaphragm 25.

When the brake system is pressurized by the master cylinder, the piston assembly 10 is moved rightward against the fluid link and against the counter force of the brake retractor springs (not shown) thereby displacing the fluid link into the brake motor (not shown). The plunger 50 and the diaphragm 45 are usually closed tightly against valve seat 37 during rightward movement of the piston assembly 10.

This adjusting mechanism is preferably designed so that the volume of fluid in its outlet chamber 54 is substantially equal to the volume required to fully actuate the brake motor to engage the brake when there is a predetermined release clearance between the braking members. Thus for example, if the brakes shoes are spaced from the brake drum at a uniform or standard clearance desired when the brake system is pressurized, then the piston assembly 10 will bottom against end cap 12 as in Fig. 2 at substantially the same time the shoes firmly engage the drum.

As soon as, or close to the time piston 18 bottoms against end cap 12, the pressure of the hydraulic fluid in inlet chamber 41 will reach the full rated pressure generated by the master cylinder. Thus this full system pressure is transmitted through passages 40 into annular groove 38 to act against the annular region 49b of the diaphragm 45 and will be of sufficient magnitude to overcome spring 53 and force the diaphragm 45 and plunger 50 away from the valve seat 37 so that there is direct communication between the inlet chamber 41 through port 36 into outlet chamber 54. Ordinarily there will be little or no flow of inlet fluid across the valve seat 37 and through port 36 immediately upon the opening of port 36, however, because the pressure in the fluid link under these conditions will then be substantially equal to the pressure of the fluid in the inlet chamber 41 of the mechanism. Throughout the period in which the brake is engaged, the diaphragm 45 stands in its open position so that the master cylinder is in direct communication with the brake motor via the open port 36 and the inlet and outlet chambers of the adjuster mechanism.

If the brake is released before there is any substantial wear on the linings or distortion of the brake members, the diaphragm 45 under the influence of the plunger 50 and plunger spring 53, immediately flaps to its closed position against valve seat 37 upon release of the hydraulic pressure. Accordingly, the fluid link is then isolated from the fluid in inlet chamber 41 during the return stroke of the piston assembly 10, and therefore the piston assembly is returned to the position of Fig. 1 with the volume of the fluid in the fluid link unchanged.

If, however, during the period in which the brake is engaged wear occurs in the brake linings and/or there is any expansion or deflection of the brake members, such conditions tend to relieve pressure in the fluid link momentarily. Since the port 36 is open while the brake is engaged, however, any pressure reduction in the fluid link immediately brings about a corresponding flow of fluid from the inlet side of piston 18 through port 36 into the fluid link until full line pressure is restored in the fluid link. The volume of the fluid link is thus progressively increased in this manner and the brake shoes are thereby stepped forward against the drum to compensate for the wear and for the expansion or deflection occurring during the braking operation. The fluid thus added to the fluid link is trapped in the fluid link by the closing of the diaphragm 45 on port 36 as soon as the brake is released. Then when the piston assembly 10 is retracted to its leftward position of Fig. 1, the added volume of fluid trapped in the fluid link relocates the released position of the brake shoe relative to the brake drum to maintain the desired uniform release clearance.

In cases where the brake members undergo substantial thermal expansion or deflection, the brake shoes will be adjusted outwardly so that they will remain in firm engagement with the brake drum throughout the period the brake is applied, and when the brake is released the brake shoe will be retracted the usual uniform distance from the drum. The subsequent cooling of the drum, however, will materially reduce this release clearance and under some conditions the contraction may be of sufficient magnitude to cause the drum to exert intense constricting force on the brake shoe. In the event the drum shrinks enough to exert such force on the shoe in the systems such as shown in Figs. 1 and 2, such force will produce a corresponding increase in pressure in the fluid link and the resulting fluid force will act through port 36 and against the central region 49a of the diaphragm 45. Eventually such force will overcome spring 53 to displace the diaphragm 45 from port 36. Then some of the fluid in the fluid link can bleed off through port 36 and through annular groove 38 and passage 40 into inlet chamber 41 until pressure in the fluid link is relieved and the brake shoe is in light dragging engagement with the brake drum. These events occur when the piston assembly 10 is in its leftward position in Fig. 1, and this flow can occur because the fluid in the inlet chamber 41 under these circumstances is at the back pressure of the braking system, usually atmospheric pressure.

Whether a dimensional change in the brake members after release merely brings about a slight reduction in the release clearance, or whether it is such as to result in a constricting force on the brake shoes to force open diaphragm 45 as described in the preceding paragraph, the desired uniform release clearance between the brake shoes and the brake drum may be automatically restored by merely depressing the brake pedal momentarily after the brake members have resumed their normal location.

When the brake pedal is depressed to reset the release clearance, piston assembly 10 is displaced forwardly from its Fig. 1 position until the brake is firmly engaged in the manner explained previously. However, since the release clearance existing when the pedal is depressed under these circumstances is less than the normal release clearance, the brake will be firmly engaged substantially before the piston assembly 10 reaches its bottomed or actuated position against end cap 12 as shown in Fig. 2. But as soon as the brake is engaged, regardless of the particular axial position of the piston assembly 10 in casing 11, the valve diaphragm 45 will be forced open to uncover port 36 by the pressure exerted against the annular diaphragm surface 49b opposite groove 38. Thereafter, although the pressure of the fluid acting against the opposing sides of the floating piston assembly 10 is balanced, the piston assembly is moved translationally rightward by the force exerted on it by main spring 57 until the piston 18 is bottomed against end cap 12 as shown in Fig. 2. During this movement the volume of the fluid link is reduced by the amount of fluid spilling backward through port 38 while the piston assembly is advanced by the force of spring 57. Thereafter as soon as the pedal or master cylinder pressure is released, the diaphragm 45 again flaps shut on port 36 and the piston assembly retracts to its position shown in Fig. 1 so that the desired release clearance is restored between the brake shoes and the brake drum.

In view of the foregoing operation of the mechanism, it may be seen that within the range of the operation of the brake motor, the brake may be maintained in engagement no matter how much the braking members expand or deflect, and by the same token, the brake may be automatically restored to accurate adjusted condition following a severe brake application by merely depressing the brake pedal momentarily. Inasmuch as the diaphragm 45 may be forced open by predetermined pressure in fluid link, it is not possible to have the brake become locked as the result of an overadjustment of the brake.

It may be noted that the diaphragm 45 is adapted to open in response to either a predetermined pressure in the inlet chamber 41 or a predetermined pressure of fluid in the outlet chamber 54 sufficient to overcome valve spring 53. Usually diaphragm 45 is opened when the assembly 10 is bottomed by the pressure on the inlet side of the assembly acting on annular surface 49b of the diaphragm opposite groove 38. Whenever pressure of fluid in the outlet chamber (i.e. the fluid link) reaches a predetermined value, the fluid can act directly on the central region 49a of the diaphragm where it is exposed through port 36 to force the diaphragm away from valve seat 37.

Variations in the construction disclosed may be made within the scope of the appended claims.

I claim:

1. Hydraulic adjusting mechanism comprising a casing member, an actuated member in said casing member, a flexible annular first diaphragm connecting said casing member and said actuated member to provide for relative axial movement of said members in sealing engagement with each other, said first diaphragm and said actuated member defining with the casing member a first chamber to receive fluid for actuating said actuated member and a second chamber to contain fluid displaceable by the actuated member, means for urging said actuated member against fluid contained in said second chamber, a port through said actuated member connecting said chambers, and valve means carried by said actuated member for regulating fluid flow between said chambers, said valve means including a second flexible diaphragm covering said port and means biasing said second diaphragm toward a position to close said port, said second diaphragm and said biasing means being operable in response to a predetermined pressure of fluid in either of said chambers for displacement away from said port to open said port in any position of the actuated member relative to said casing.

2. In a hydraulic adjusting mechanism, a casing member, an actuated member movable in said casing member and defining with the casing member a first chamber to receive fluid from actuating said member and a second chamber to contain fluid displaceable by the actuated member, means biasing the actuated member toward fluid contained in said second chamber, a port connecting said chambers, and valve means for regulating fluid flow between said chambers, said valve means including a flexible diaphragm covering said port and means biasing said diaphragm toward a position to close said port; said diaphragm and said biasing means being operable in response to a predetermined pressure of fluid in either of said chambers for displacement away from said port to open said port in any position of the actuated member relative to said casing.

3. In a hydraulic adjusting mechanism, a casing member, an actuated member movable in said casing member in sealing engagement with the interior of the casing member, a first chamber to receive fluid for actuating said member and a second chamber to contain fluid displaceable by the actuated member, means biasing said actuated member toward said second chamber, a port through said actuated member connecting said chambers, a valve seat at the mouth of said port adjacent said first chamber, a housing carried by said actuated member and surrounding said valve seat, said housing having one end closed to fluid in either of said chambers, a diaphragm having its periphery fastened in sealing engagement with said housing and having a central region adapted to cover and close said port at said valve seat and having an annular flexible region between the periphery thereof and said central region to permit deflection of said center region toward or away from said valve seat, means in said closed end of said housing acting against one side of said central region of said diaphragm to bias said diaphragm toward a closed position on said valve seat, said annular flexible portion of said diaphragm together with opposing portions of said actuated member defining an annular channel adapted to contain fluid when said diaphragm is closed on said valve seat, and a passage opening into said channel from said first chamber to communicated fluid from said first chamber to said annular flexible region of said diaphragm, said diaphragm being adapted for deflection away from said valve seat to open said port in reponse to a predetermined fluid pressure in either said first or said second chambers.

4. Mechanism in accordance with claim 3 in which said actuated member is connected in sealing engagement with said casing member by an annular diaphragm flexible to provide relative axial movement between said actuated member and said casing member.

5. Mechanism in accordance with claim 4 in which the diaphragm referred to in claim 4 is annular with its inner periphery fastened to said actuated member and with its outer periphery fastened to said casing member in a plane midway between the extreme axial positions of said actuated member in said casing member, and a groove in said casing member to minimize the extent to which the diaphragm is flexed as the actuated member is displaced in the casing member.

References Cited in the file of this patent

UNITED STATES PATENTS

| 368,089 | Hinds | Aug. 9, 1887 |
| 2,513,015 | Fike | June 27, 1950 |

FOREIGN PATENTS

| 711,336 | Great Britain | June 30, 1954 |

UNITED STATES PATENT OFFICE
CERTIFICATE OF CORRECTION

Patent No. 2,954,673                             October 4, 1960

Burlin W. Oswalt

It is hereby certified that error appears in the printed specification of the above numbered patent requiring correction and that the said Letters Patent should read as corrected below.

Column 6, line 72, for "from" read -- for --.

Signed and sealed this 11th day of April 1961.

(SEAL)

Attest:
ERNEST W. SWIDER
Attesting Officer

ARTHUR W. CROCKER
Acting Commissioner of Patents